(12) United States Patent
Faircloth

(10) Patent No.: US 12,354,125 B2
(45) Date of Patent: Jul. 8, 2025

(54) COMPUTER IMPLEMENTED SYSTEM AND METHOD FOR OPTIMIZING PRICE AND PERFORMANCE OF COMPUTATIONAL SERVICES

(71) Applicant: Daniel Faircloth, Huntsville, AL (US)

(72) Inventor: Daniel Faircloth, Huntsville, AL (US)

( * ) Notice: Subject to any disclaimer, the term of this patent is extended or adjusted under 35 U.S.C. 154(b) by 375 days.

(21) Appl. No.: 17/699,316

(22) Filed: Mar. 21, 2022

(65) Prior Publication Data
US 2023/0298059 A1     Sep. 21, 2023

(51) Int. Cl.
G06Q 30/02     (2023.01)
G06F 9/48      (2006.01)
G06F 9/50      (2006.01)
G06Q 30/0201   (2023.01)

(52) U.S. Cl.
CPC ....... *G06Q 30/0206* (2013.01); *G06F 9/4881* (2013.01); *G06F 9/505* (2013.01); *G06F 9/5077* (2013.01)

(58) Field of Classification Search
CPC .............. G06Q 10/06; G06Q 30/0283; G06Q 10/0633; G06Q 10/04; G06Q 30/0206; G06N 20/00; G06N 3/045; G06F 9/4881; G06F 9/505; G06F 9/5077
See application file for complete search history.

(56) References Cited

U.S. PATENT DOCUMENTS 8,306,865 B2    11/2012  Head et al.
8,473,272 B1 *   6/2013  Donlin .................... G06F 30/34
                                                    716/109
8,781,977 B1     7/2014  Huberman et al.
8,799,056 B2     8/2014  Kunjur et al.
9,888,078 B2     2/2018  Jain et al.
(Continued)

FOREIGN PATENT DOCUMENTS

JP          2016507121 A      3/2016

OTHER PUBLICATIONS

Chunlin Li, Optimal resource provisioning for cloud computing environment, Apr. 25, 2012, The Journal of Supercomputing, vol. 62, pp. 989-1022 (Year: 2012).*

(Continued)

*Primary Examiner* — Florian M Zeender
*Assistant Examiner* — Milena Racic
(74) *Attorney, Agent, or Firm* — Lanier, Ford, Shaver & Payne, PC; Gerald M. Walsh

(57) ABSTRACT

A computer-implemented method for providing a range of prices for a range of predicted performance wall-clock computing times for executing a desired software operation. A user uploads data of a desired software operation to a service provider. The service provider analyzes the data using a resource estimation model, determines resource options, and converts the resource options into a range of prices and corresponding predicted performance wall-clock times for execution of the desired software operation. The user selects a particular price and corresponding predicted performance wall-clock time and requests execution of the selected software operation using the resource option associated with the selected price and corresponding wall-clock time. An opportunity is provided to the user to optimize price based on either a need for more timely solutions or a need to minimize costs.

11 Claims, 9 Drawing Sheets

(56) References Cited

U.S. PATENT DOCUMENTS

| | | | | |
|---|---|---|---|---|
| 10,051,082 | B2* | 8/2018 | Borley | H04L 67/51 |
| 10,581,689 | B2 | 3/2020 | Moguel et al. | |
| 10,938,882 | B2 | 3/2021 | Lin et al. | |
| 11,354,061 | B2* | 6/2022 | Prado | G06F 3/0611 |
| 11,875,371 | B1* | 1/2024 | Doner | G06Q 30/0283 |
| 2009/0037287 | A1* | 2/2009 | Baitalmal | G06F 21/128 |
| | | | | 705/27.1 |
| 2010/0100250 | A1* | 4/2010 | Budhraja | H02J 3/003 |
| | | | | 709/224 |
| 2013/0031401 | A1* | 1/2013 | Shin | G06F 1/14 |
| | | | | 713/401 |
| 2013/0117063 | A1 | 5/2013 | Rangarajan et al. | |
| 2014/0075016 | A1* | 3/2014 | Chatterjee | G06F 16/2282 |
| | | | | 709/224 |
| 2014/0297866 | A1 | 10/2014 | Ennaji et al. | |
| 2016/0359683 | A1* | 12/2016 | Bartfai-Walcott | H04L 41/40 |
| 2017/0076372 | A1* | 3/2017 | Kozloski | G06F 21/10 |
| 2021/0117844 | A1* | 4/2021 | Haener | G06F 8/311 |
| 2022/0035668 | A1* | 2/2022 | de Capoa | G06F 11/3433 |
| 2022/0121633 | A1* | 4/2022 | Quader | G06F 16/213 |
| 2023/0298059 | A1* | 9/2023 | Faircloth | G06F 9/505 |
| | | | | 705/7.35 |

OTHER PUBLICATIONS

Ivan Svogor, An extensible framework for software configuration optimization on heterogeneous computing systems, Time and energy case study, Jan. 2019, Information and Software technology, vol. 105, pp. 30-42 (Year: 2019).*

* cited by examiner

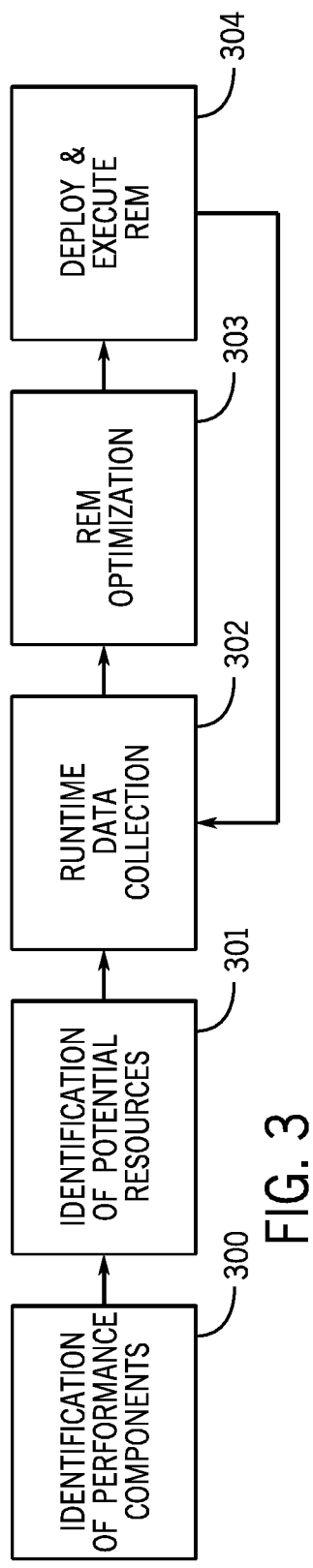
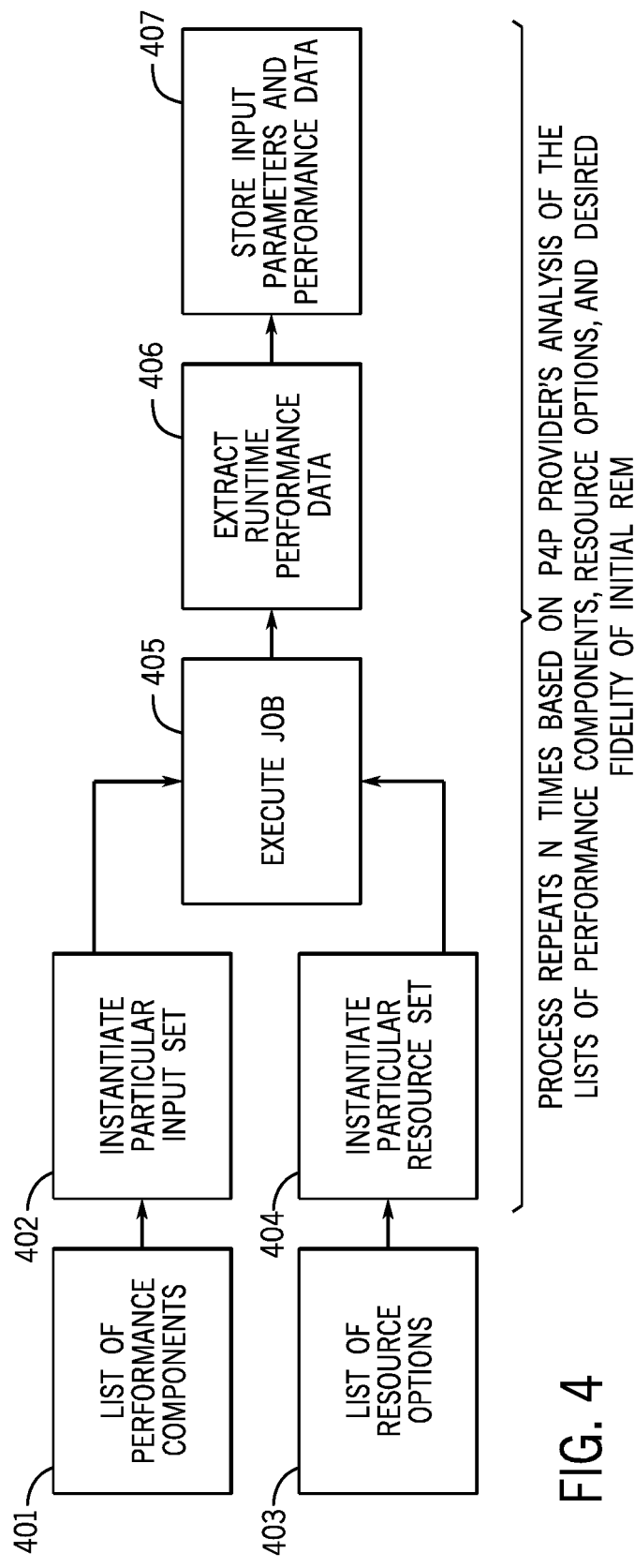

| PARAMETERS | CITY | STATE |
|---|---|---|
| MINIMUM MEMORY | 32 GB | 256 GB |
| LOWEST-PRICE CONFIGURATION | r6i.xLARGE | r5a.8xLARGE |
| PRICE / HOUR | $0.30 | $2.17 |
| HOURS | 100 | 1000 |
| PRICE | $30 | $2170 |
| MODERATE PERFORMANCE CONFIGURATION | c5.4xLARGE | (2) g4dn.8xLARGE |
| PRICE / HOUR | $0.82 | $5.22 |
| HOURS | 50 | 750 |
| PRICE | $41 | $3915 |
| MINIMUM PERFORMANCE CONFIGURATION | p3.2xLARGE | (16) g4dn.xLARGE |
| PRICE / HOUR | $3.67 | 10.08 |
| HOURS | 20 | 500 |
| PRICE | $73.40 | $5040 |

FIG. 7

| PARAMETERS | FastCFD PARAMETRIC SIMULATIONS |
|---|---|
| MINIMUM MEMORY | 1 TB |
| LOWEST-PRICE CONFIGURATION | (16) SMALL NODES |
| PRICE / HOUR | $32 |
| HOURS | 320 |
| PRICE | $10,240 |
| MODERATE PERFORMANCE CONFIGURATION | (32) MEDIUM GPU NODES |
| PRICE / HOUR | $96 |
| HOURS | 160 |
| PRICE | $15,360 |
| MODERATE PERFORMANCE CONFIGURATION #2 | (128) LARGE GPU NODES |
| PRICE / HOUR | $256 |
| HOURS | 80 |
| PRICE | $20,480 |
| MAXIMUM PERFORMANCE CONFIGURATION | (128) LARGE GPU NODES WITH PARAMETRIC ACCELERATION |
| PRICE / HOUR | $1024 |
| HOURS | 32 |
| PRICE | $32,768 |

FIG. 8

COMPUTER IMPLEMENTED SYSTEM AND METHOD FOR OPTIMIZING PRICE AND PERFORMANCE OF COMPUTATIONAL SERVICES

FIELD OF THE INVENTION

The invention relates generally to systems and methods for providing computer implemented computational services and, more particularly, to a computer implemented system and method providing a customer a range of prices for providing a tailorable performance configuration of a computational service, wherein a customer can optimize price based upon time to complete the computational service.

BACKGROUND OF THE INVENTION

Traditionally, customers obtain access to software under two primary licensing models: perpetual and time-based. Perpetual licensing typically involves paying a fixed fee for access to a certain number of instances of the software. Companies using a perpetual model tend to also offer customers the option of paying a maintenance fee (usually annually) to maintain access to technical support and the latest versions of the software. With time-based licensing, access to a certain number of instances is limited to a fixed period of time and may be billed to the customer similar to a monthly or annual subscription.

In both cases, licensing may be further subdivided into user-locked, node-locked, key-locked, or floating types. User-locked licenses are intended to the restrict the software to a single user and is usually enforced by checking for a specific username. Node-locked licenses function similarly expect that they are locked to a specific computer. Key-locked licenses are tied to a hardware license enforcement device such as a USB key that can be moved from computer to computer. Finally, floating licenses allow users to access the software anywhere on a network by checking the number of entitled instances on a license server. An example of user-, node-, and floating-type license based software is Mathworks' MATLAB.

These methods have, more or less, defined the state of software licensing for several decades. Recently, the software-as-a-service (SaaS) business model has become popular due to the prevalence of web-based technologies, the ubiquity of cloud computing solutions, and a nearly universal availability of internet access. The SaaS licensing model functions most often similar to the time-based licensing approach where users subscribe to a certain level of access for a length of time. A common example of this is a SaaS model allowing increased software capability priced per user per month or for a group of users per month. A similar example provides customers with access to a certain volume (i.e., number of simultaneous users or running instances of the software) over a period of time.

Modeling & simulation (M&S) software has historically been limited to the traditional licensing schemes due to the need for specialized information technology (IT) hardware and infrastructure. Many types of M&S software such a computational fluid dynamics (CFD), computational electromagnetics (CEM), and structural analysis can be computationally demanding, requiring significant investment in individual workstations and cluster computing resources. The computational demand may originate from the sheer scale of an individual simulation in terms of memory and/or runtime or from the volume of simulations required (e.g., high-dimensionality parametric analysis and optimization).

Under this model, users of computational physics (CP) M&S software have been limited in the overall throughput of simulations that can be achieved due to 1) lack of computational resources and 2) lack of licenses that support scaling across many resources. With the seemingly infinite computational scale of cloud computing resources provided through services like Amazon Web Services, Microsoft Azure, and Google Cloud, there is a path forward to resolve the first issue. Users can select among individual instances with a wide variety of processing, memory, graphical processing unit (GPU), networking, and storage capabilities and instantiate nearly any configuration in whatever volume is desired. In this case, the user's only limitations are organizational and project budgets for the cloud computing resources and the availability of licenses.

This last issue remains significant, however. To date, there are two types of M&S SaaS cloud-based business models. First, customers may lease the software at a fixed volume of usage. This is similar to buying a fixed number of time-based, floating licenses and undermines the inherent potential of SaaS cloud-based computing. The second approach is the more flexible (and expected) usage-based model, which is ideal for addressing surge-style M&S needs.

With a usage-based licensing model, users can reap the benefits for SaaS cloud-based M&S. However, users have no means of determining a priori the cost of running a simulation, nor do they have insight into the diminishing return for adding more processors or GPUs. Further, the user has no ability to pay more (or less) based on the timeliness of their need.

There is currently no general way to request services from a cloud provider and achieve a certain desired performance. The best a user can currently do is select a larger allocation of resources than the minimum required and hope that performance is improved compared to a selection of lesser resources. This requires substantial application experience with a given set of resources to develop an intuition about performance vs. resource count.

There is currently no way to tune the performance based on the price the user is willing to pay without domain expertise in both high performance computing and the M&S software in question. This required multi-domain expertise inhibits even advanced users from achieving optimal job performance since "optimal" may mean a specific balance of wall-clock time and price. While individuals may acquire this multi-domain expertise, the result of tuning efforts is likely to be qualitative and imprecise. Furthermore, existing licensing models are not applicable to this type of performance tuning and therefore hinder a user from even attempting such tuning.

Current software does not leverage historical data on performance when utilizing on-premises or cloud resources. With the breadth of resource options available through cloud providers, it is unlikely current software can effectively use data collected in another computing environment. What is needed is a method and system that provides better information to a customer about estimated price and an opportunity for the customer to optimize price based on either a need for more timely solutions or a need to minimize costs.

SUMMARY OF THE INVENTION

The present invention is a computer-implemented system and method wherein a service provider provides a range of prices for a range of predicted performance wall-clock computing times for executing a desired software operation. A user of this system and method prepares data of a desired software operation, using a preprocessing computer-implemented method offered by the service provider. The user uploads the data, through a computer system, to a computer system of the service provider, and requests the service provider's services for execution of the desired software operation, at a selected predicted performance wall-clock time.

The service provider analyzes the data in the service provider's computer system using a resource estimation model and thereby determines resource options. The resource options are converted into a range of prices and corresponding predicted performance wall-clock times for execution of the desired software operation. The service provider, through the service provider's computer system, presents to the user, through the user's computer system, a list of the range of prices and corresponding predicted performance wall-clock times for execution of the desired software operation.

The user selects a particular price and corresponding predicted performance wall-clock time and requests an execution of the desired software operation by the service provider using the resource option associated with the selected price and corresponding wall-clock time. The service provider executes the desired software operation using the resource option associated with the selected price and corresponding wall-clock time. The service provider provides the user the results of executing the desired software operation, bills the user for the results, and receives payment from the user for the results.

Predicted performance wall-clock time data may be collected from the resource estimation model during executions of a desired software operation. Using the resource estimation model includes identification of the desired software operation's wall-clock time-influencing components and identification of potential resources. Performance wall-clock time data are collected for each component of the potential resources. The resource estimation model is optimized determine performance wall-clock times and is executed to predict performance wall-clock times required to complete execution of the desired software operation.

Collecting predicted performance wall-clock time data for each component of the desired software operation on the potential resources further includes instantiating a particular input set from the desired software operation and instantiating a particular resource set from a list of resource options. The desired software operation on the is executed and predicted performance wall-clock time data are extracted. Input parameters and wall-clock time data are stored. These steps are repeated to optimize the resource estimation model's accuracy in predicting wall-clock times.

Optimization of the resource estimation model for predicted performance wall-clock time prediction further includes selecting an initial resource estimation model and initializing control parameters of the initial resource estimation model. The resource estimation model is executed on the input set and resource estimation model error is evaluated to determine if resource estimation model error is less than threshold wherein optimization is complete.

Executing the resource estimation model to predict performance wall-clock times to complete execution of the desired software operation further includes obtaining a list of available resources, selecting an initial resource set, and obtaining user input data. The optimized resource model is executed, a predicted performance wall-clock time list is appended and sorted, and price determination of predicted performance wall-clock times is initiated. A minimum price is determined from a resource set with the lowest predicted performance wall-clock time.

BRIEF DESCRIPTION OF THE DRAWINGS

FIG. 3 is a flow chart of the resource estimation model (REM) development process used in the P4P system and method.

FIG. 4 is a flow chart of a runtime performance data collection process used in the development of a REM specific to a software.

FIG. 7 is a table showing a sampling of resources mapped to different simulation scales and performance.

FIG. 8 is a table showing three resource-price results for a parametric simulation.

DETAILED DESCRIPTION OF THE INVENTION

While the following description details the preferred embodiments of the present invention, it is to be understood that the invention is not limited in its application to the details of arrangement of the parts as described and shown in the figures disclosed herein, since the invention is capable of other embodiments and of being practiced in various ways.

"Pay for performance" (P4P) is a system and method of executing software functions with pricing determined by a customer's desire for runtime performance (wall-clock time) to execute desired software operations. The P4P model provides the user with all of the aforementioned SaaS and cloud-based computing benefits while providing better information to the user about estimated price and an opportunity to optimize price based on either a need for more timely solutions or a desired to minimize costs.

Definitions

P4P service provider—A business providing P4P licensed software service.
P4P software—Software enabled to use a P4P license model.
Cloud service provider—A business offering infrastructure-as-a-service (IaaS) such as Amazon Web Services or Microsoft Azure.
Customer—A person or business desiring to use the P4P licensed software service.
User—A person or computational agent within a customer's organization that interacts with the P4P service.
Job—A computational workload requested by a user.

Performance—The total wall-clock time required to execute a requested job once initiated Resources—Includes CPU cores (or equivalent units of CPU capability), memory (e.g., RAM), storage (e.g., hard drive space), network bandwidth, GPUs, TPUs, FPGAs, specialized chipsets (e.g., ASICs). Time may also be considered a resource.

Price—The cost to a customer for a job.

Resource set—A combination of resources.

AWS—Amazon Web Services.

Figure 1:
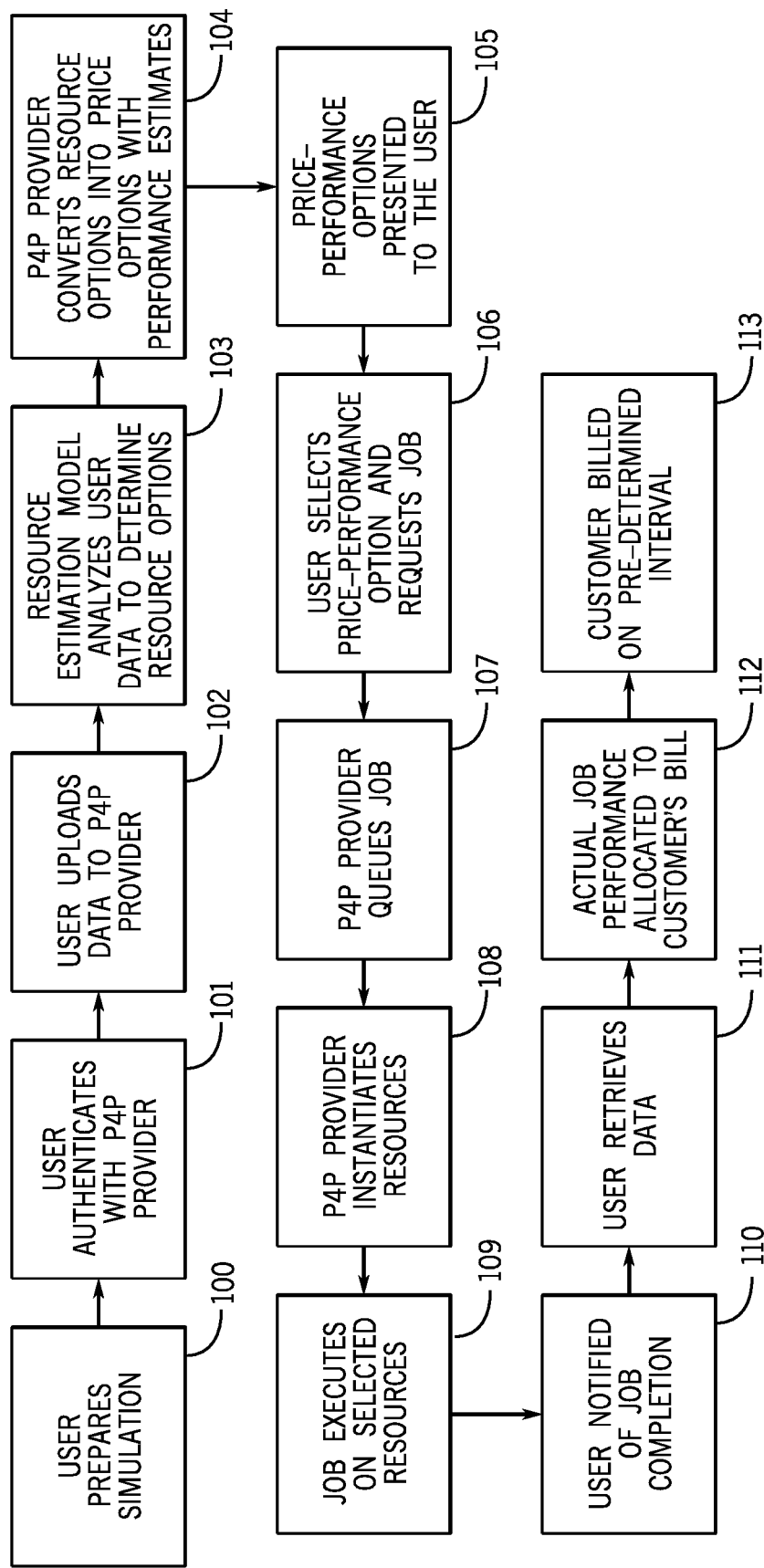
FIG. 1 is a flow chart of the Pay for Performance (P4P) system and method of the present invention in a cloud-based environment.

The P4P process uses a multi-step approach to optimize performance-price tradeoffs for the customer. The P4P Software method may be used in both cloud or on-premises environments. The process for cloud-based usage is illustrated in FIG. 1. First, the user prepares the simulation for execution using the particular pre-processing method offered by that software 100. This may involve CAD preparation, meshing, simulation input configuration, and specification of material properties, boundary conditions, and desired outputs. For other types of simulations, such as machine learning training, this may involve data preparation and other relevant pre-processing activities. Once the simulation is prepared, the user authenticates with the P4P service provider to verify the user's authorization to use the P4P software 101. Once authenticated, the user uploads the required simulation data to the P4P service provider through the service's portal 102. This portal may be provided through a web or programmatic interface. With the data in hand, the P4P service provider analyzes the user's data using a resource estimation model (REM) to determine resource options 103. The resource options are converted into a range of estimated prices with performance estimates 104. The combination of resource and price determination are described in the next sections. The range of prices with corresponding performance is presented to the user through the service's portal 105. The user may then select a particular price-performance option and request the job execution 106. The P4P service provider then queues the job 107 and instantiates the required resources 108. The job executes on the selected resources 109 during which time the user may monitor job status. Once completed, the user is notified 110 and may retrieve the output data 111. The actual job performance achieved updates the price and allocates it to the customer's bill 112. On a pre-determined interval (typically monthly), the customer is invoiced by the provider 113.

Figure 2:
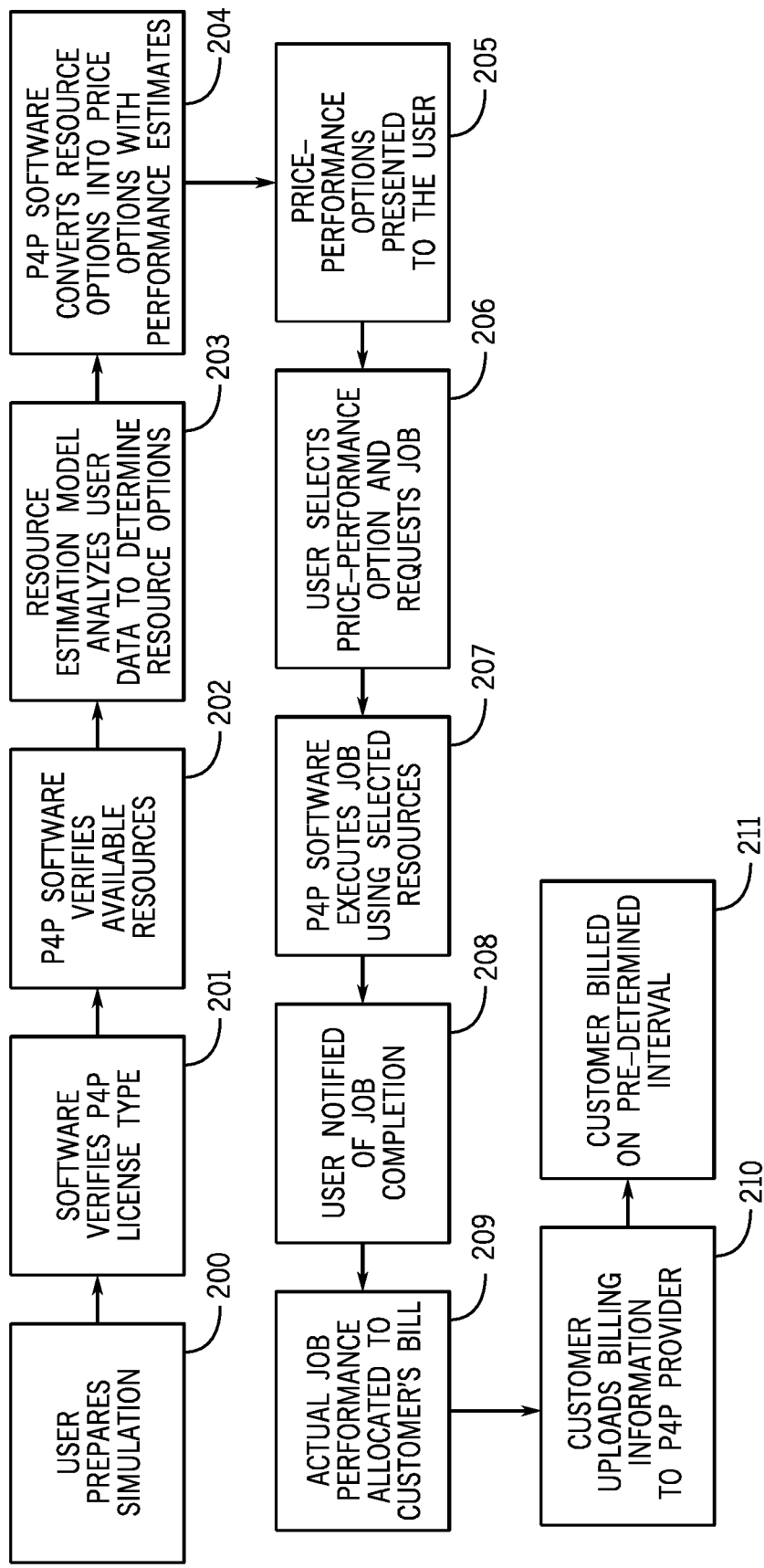
FIG. 2 is a flow chart of the P4P system and method in an on-premises environment.

The P4P model may also be used on-premises using a customer's existing resources. The process for the on-premises model is illustrated in FIG. 2 and is similar to the cloud-based approach with a few notable exceptions. In this case, the user prepares the simulation 200 and the software verifies that the user has a P4P license type 201 (as opposed to other license types described previously). The software then verifies available resources 202 that have been exposed to the software by the customer. Based on these resources, the P4P software determines resource options 203 and converts those into price options 204. The process continues similar to the cloud approach through steps 205-211. In the case where the customer's software installation has internet access to the P4P provider, the customer's bill is updated. In the case where no internet connection is possible, the billing information is allocated locally and must be uploaded to the P4P provider on a pre-determined interval 212. Invoicing occurs as it does for the cloud-based method.

Resource Determination Model

Any piece of software involving complex time- and/or data-intensive calculations will necessarily employ one or more algorithms that influence a particular job's minimum resource requirements and achievable improvement in performance using additional resources. Most algorithms cannot reasonably obtain continued performance improvement by adding more and more resources (i.e., there are diminishing returns). Thus, determining and quantifying the performance of the software as a whole as well as that of its component algorithms is key to providing users with an effective range of resource options. When users consistently use a piece of software on a given set of resources, they inevitably develop an intuition for the performance achievable. However, given the variety of data that may be involved affecting the performance, this intuition is qualitative at best. Further, when different resources are made available, this reduces the accuracy and effectiveness of any developed heuristics for performance estimation. In order to overcome this problem, it is critical to develop a quantitative scheme for analyzing the job configuration parameters, estimating the minimum resource configuration to successfully complete the job (in any length of time), and estimating the achievable performance across a variety of resource types to include scalability across the number of resources. The resource estimation scheme is generic across software and resources, but its implementation will be specific to software and the analyzed variety of resources.

The REM development process is divided into 5 steps (see FIG. 3):

1 Identification of the Software Application's Performance-Influencing Components 300

The performance-influencing components consist of job configuration parameters (e.g., inputs, desired outputs, runtime options, etc.). The user's selection of inputs and desired outputs will impact the stages of job execution differently. Similarly, the breadth and applicability of different runtime options will impact the stages of job execution. For example stage #2 of an application may be able to utilize multiple GPUs while no other stages can.

2. Identification of Potential Resources 301

The REM is informed by many different resource parameters such as CPU clock speed, number of CPU cores, amount of RAM, number and type of GPUs, network bandwidth, etc. The P4P-enabled software interrogates the resources to collect these parameters as inputs to the REM. If the software cannot leverage certain hardware (e.g., GPUs), that hardware will not be included in the model inputs.

3. Runtime Performance Data Collection for Each Component 302

Before the specific software's resource model can be used in service of a specific customer, initial data must be collected on a variety of jobs (see FIG. 4). The P4P provider executes the software across a range of input values and on a variety of resources. Runtime performance is collected in a database for use in initial model optimization (see step 303). Even after deployment of the REM, as jobs are executed, data continue to be collected for further optimization of the REM.

4. Optimization of the REM for Runtime Performance Prediction 303

The REM is a nonlinear function fitting operation that maps the job parameters and available resources to the total runtime and peak memory requirements. During this stage, an optimization algorithm is used to determine the proper mathematical form of the REM (based on a list of potential REM types such as polynomial, neural network, etc.) and the optimal values of the control parameters operating on the REM inputs (see FIG. 5). The optimization process iteratively tunes the control parameters to achieve a low level of error between inputs-to-performance data collected in step 303 to that predicted by the REM as it is being optimized. Once a threshold error is achieved, the REM can be deployed with the software in either cloud or on-premises environments.

5. Execution of the REM to Predict Performance 304

Figure 6:
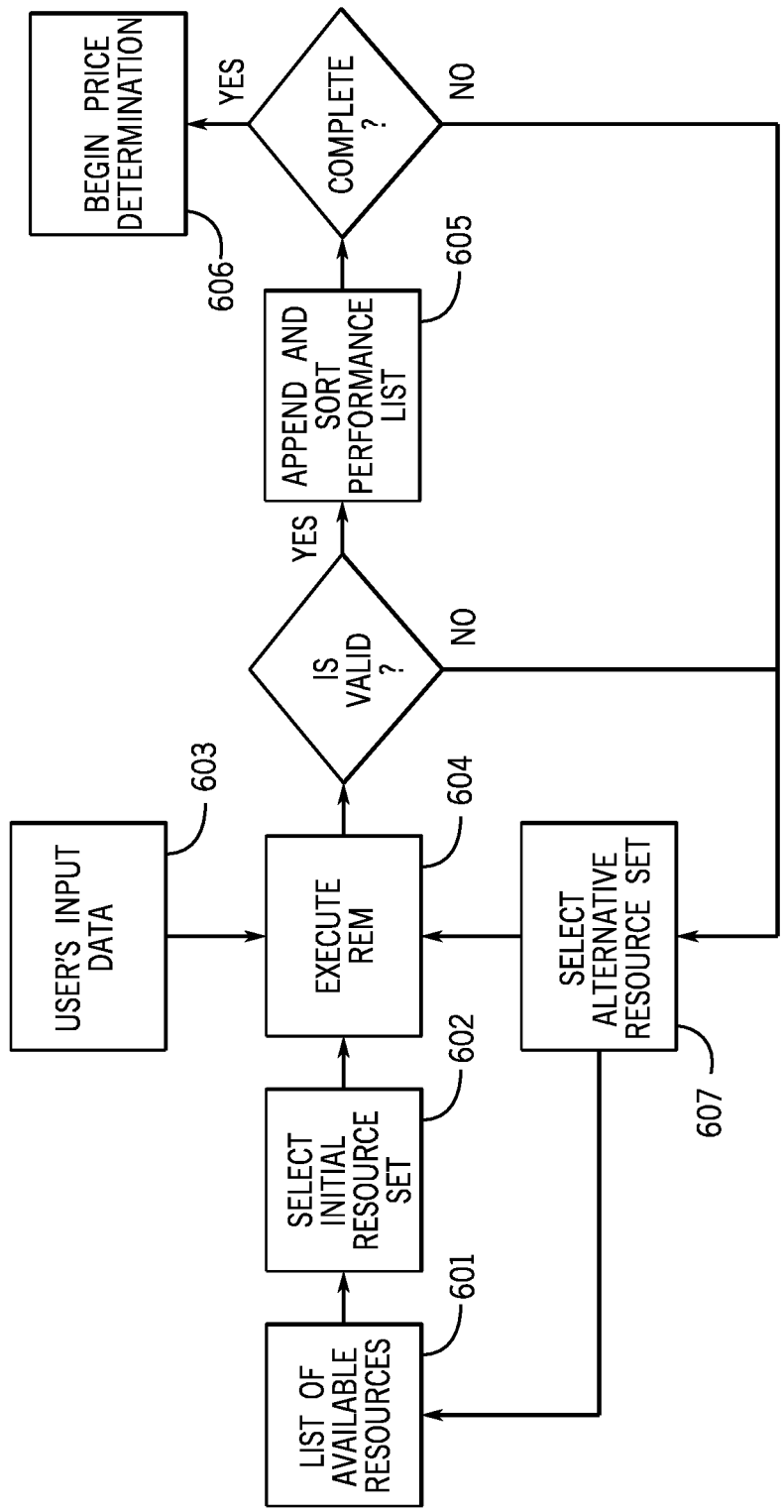
FIG. 6 is a flow chart of a REM execution process.

The user's inputs for a specific job are collected by the REM. In the case of cloud-based execution, the REM iteratively cycles through possible permutations of resources to identify a range of performance outputs as shown in FIG. 6. For cases in which the total memory required exceeds that available (e.g., on individual computation nodes, individual GPUs, or in aggregate), the resource option is rejected. As permutations of resource sets are executed, a sorted performance list (a list of total wall-clock times) is created for passing to the price determination model. For on-premises execution, the user's resources are passed as inputs into the model to obtain a performance prediction.

Steps 300-303 are executed to the develop the REM for the specific software application. Once the initial REM is completed, it is deployed with the software either to the cloud-provider or in the on-premises software. Step 304 is the primary execution of the REM. For cases, where resources available exceed the resources in the REM, the REM will extrapolate to provide an estimate of resources required. For example, if new computational resources are added to a cloud provider's pool of resources or a customer with an on-premises solution adds new hardware, the REM will extrapolate based on currently available information. Once actual performance data is obtained, the REM will be updated via steps 302-304.

FIG. 4 is a flow chart of a runtime performance data collection process used for initializing the REM. A list of performance components 401 is incorporated as a particular input set 402 and a list of resource options 403 is incorporated as a particular resource set 404. A job is executed 405, runtime performance data is extracted 406 and input parameters and performance data are stored 407. The process repeats based on the P4P service provider's analysis of the lists of performance components, resource options, and desired fidelity of the initial REM.

Figure 5:
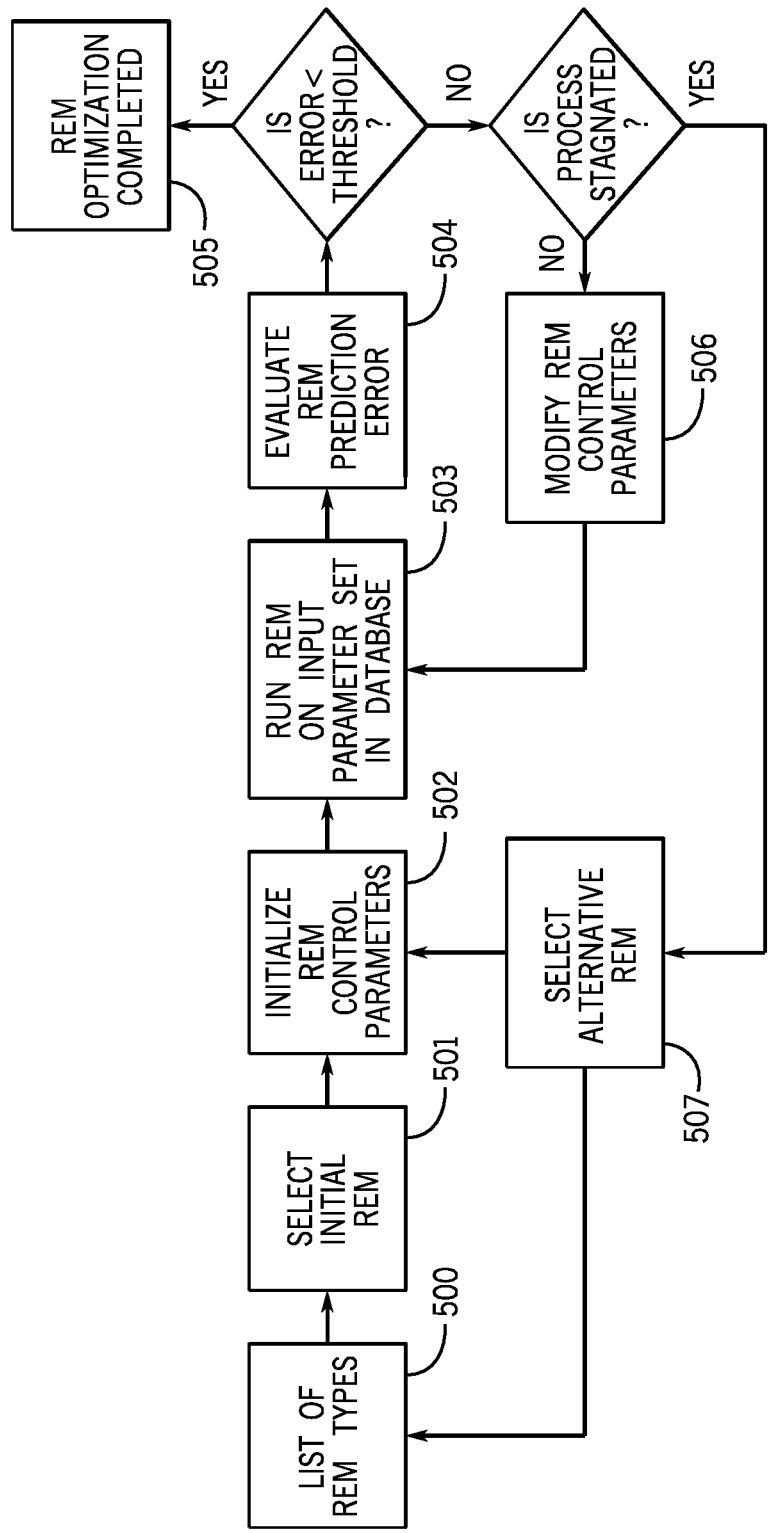
FIG. 5 is a flow chart of a REM optimization process which uses collected performance data to optimize the REM.

FIG. 5 is a flow chart of the REM optimization process. A list of candidate REM types is obtained 500, an initial REM type is selected 501, REM control parameters are initialized 502, the REM is run on an input parameter set in the database 503, and REM prediction error is evaluated 504. REM types may be of any kind that is suitable for mapping input data to output performance estimates (e.g., polynomials, neural networks, etc.). If the error is less than threshold the function optimization is complete 505. If the error is not less than threshold and the process is not stagnated the function control parameters are modified 506 and steps 503-594 are repeated. If the error is not less than threshold and the process is stagnated an alternative candidate REM type is selected 507 and the process repeats at step 500 or 502.

FIG. 6 is a flow chart of a REM execution process. A list of available resources is obtained 601, an initial resource set is selected 602, and user's input data is obtained 603. The optimized REM is then executed 604. If the output of the REM is valid, a performance list is appended and sorted 605. If the performance list is complete, price determination can begin 606. If the function output is not valid and/or the performance list is not complete, then an alternative resource set is selected 607 and the process repeats at step 601 or 604.

Price Determination Model

Determining the price of a given job is based on the platform (e.g., cloud vs. on-premises) and the sorted list of performance predictions provided by the REM execution process. For a given cloud platform, such as Amazon Web Services (AWS), prices are published for different fixed sets of resources. For example, the c5d.24xlarge instance type on AWS costs $4.608/hour and provides 96 CPU units, 192 GB of RAM, 25 Gb Ethernet, and 3.6 TB of disk space with additional storage configurable and calculated separately. The minimum price is determined from the resource set with the lowest performance prediction. By iterating over the performance list, a price is assigned and presented to the user. The user may select among the full list or select quickly from minimum, moderate, and maximum performance options automatically selected from the performance-price list.

In a cloud environment, the availability of resources can fluctuate. The P4P service provider will query the cloud provider based on the selected performance to ascertain the availability of the required resources. If the resources are available, the user may schedule and execute the job. If the resources are not available, the pricing model will iterate over the performance-price list to find the closest resource set available and present the option to the user.

In an on-premises environment, the pricing model compares the user's resources and estimated run time to a pricing list determined at the P4P provider's discretion.

EXAMPLES

Example 1—Large-Scale Weather Pattern Prediction Using Cloud Resources

Weather Simulation, Inc. (WSI) offers a WeatherX simulation software to customers such as meteorologists and climatologists. The computational scale of WeatherX simulations can be substantial and often prohibit their customers from performing the desired weather pattern predictions using limited on-premises resources. To remedy this, WSI is releasing a new version of WeatherX that supports cloud-based execution and can scale across hundreds of computational nodes with GPU acceleration support. To further streamline the user experience, this version of WeatherX will offer a web-based interface to simplify model setup.

To enable the P4P licensing model, WSI has ported WeatherX to AWS and executed the REM development process (FIG. 3) by performing a series of initial runs of typical weather pattern predictions at different geographical scales (e.g., city, state, regional, and national). The REM optimization process selected a neural network as the optimal model format, and the control parameters for the neural network were tuned on the data generated from the initial runs performed with WeatherX. With the software and REM deployed on AWS, WSI offers the P4P option to its customers.

A university studying local weather patterns decides to use WeatherX's new P4P pricing model to support parametric analyses of city-level and state-level weather. Graduate students in the research group prepare WeatherX simulations using the web interface and initiate the pricing estimator. Based on the REM, the users are presented with options for minimum, moderate, and maximum performance and associated prices. FIG. 7 shows the options presented to the users for both city and state level simulations. Note that WeatherX's pricing assumes a uniform 20% markup on AWS instance prices, which are priced per hour. The research group requires a daily update to the city-level prediction but only monthly updates to the state-level predictions. Thus, they select the maximum performance option for city-level, which is priced at $73.40 for the job, and the lowest-price option for the state-level simulation, which is priced at $2,170.

For both simulations, the WeatherX P4P license module queries AWS resource availability and finds all required resources are available. The users select to execute the jobs and are subsequently notified at the time of each job's completion. The costs of the jobs are allocated to the research group's account with WSI, and WSI invoices the university on a monthly basis.

Example 2—Automotive Computational Fluid Dynamics

CFD Group provides FastCFD, a high-fidelity computational fluid dynamics (CFD) software package for the automotive industry. The automotive industry relies heavily on accurate CFD simulations to design vehicles with efficient shapes for enhanced fuel efficiency. These simulations are computationally challenging, often requiring days or weeks on typical cluster computers. Auto makers are hindered by a lack of access to software and licensing schemes that support rapid design iteration. By incorporating the P4P licensing model, a proprietary scalable cloud-based environment, and a GPU-accelerated solver, FastCFD is well-suited to address these problems for CFD Group's customers.

One such customer is Electra, a start-up electric vehicle company. Electra is using FastCFD to design their latest vehicle and is beginning a series of parametric design studies to optimize the vehicle shape. To begin, Electra design engineers log in to CFD Group's web portal for FastCFD. The simulation model is prepared using a client-side CAD and a model pre-processing component of FastCFD. In this pre-processing stage, the design engineer identifies and flags several design parameters to be studied in a parametric analysis, which ultimately consists of 100 CFD simulations. The simulation files with parametric settings are uploaded to the FastCFD cloud portal. FastCFD, using the resource estimation model established by CFD Group, determines the minimum required resources to execute one parameter set of Electra's simulation. The REM ranks several other potential configuration options. FastCFD has a feature that can further accelerate parametric studies executed on a common set of distributed resources, and this option provides the highest possible performance on CFD Group's cloud environment. The REM passes these configuration options to the pricing model, which in turn presents the price and performance results shown in FIG. 8 to the design engineer.

Due to the critical timeline involved and the flexibility of the project budget, the design engineer selects the maximum performance option and initiates the simulation. After the job completes, the engineer retrieves the data to analyze on the client-side component of FastCFD. Electra's bill is updated and invoiced.

Example 3—Artificial Intelligence Model Training

DataMine is the developer of the MineAI artificial intelligence (AI) and machine learning (ML) training service. DataMine services companies with large, structured or unstructured data sets seeking data analytics and machine learning model development. MineAI is data-agnostic and provides automated selection and training of optimal ML models based on desired customer outcomes. Due to the sensitive nature of many customers' datasets, DataMine offers MineAI in both cloud-based and on-premises versions and employs the P4P licensing model to support customer ML model development timelines.

4Sight is a medical company developing AI-based cancer diagnostic models for a variety of cancer types that might be detected across a wide range of imaging and other diagnostic procedures. 4Sight has collected many terabytes of data from multiple partners and has a large set of cluster computing resources on-premises.

To develop a ML model from a new dataset, a 4Sight data analyst prepares MineAI software to execute on their local cluster. Following the process in FIG. 2, MineAI verifies the type of available resources for executing a P4P training set. Currently, there are 32 computational nodes available each with 1 GPU. The REM within MineAI uses a neural network-based algorithm to estimate the performance of different computational resource configurations. MineAI determines that the minimum resource requirement is only one node and does not require the GPU. The training operation will take 120 hours and cost $120. The model further determines that the maximum performance can be achieved using all 32 nodes with the GPUs. This maximum performance configuration will only take 1 hour to execute and will cost $5000. The user is presented with a spectrum of performance-price options indicating the performance achievable using different fractions of the total cluster resource pool. Due to another high priority project vying for these same resources, the data analyst selects the low price configuration. The job executes and the 4Sight account updates to DataMine and invoices DataMine.

Figure 9:
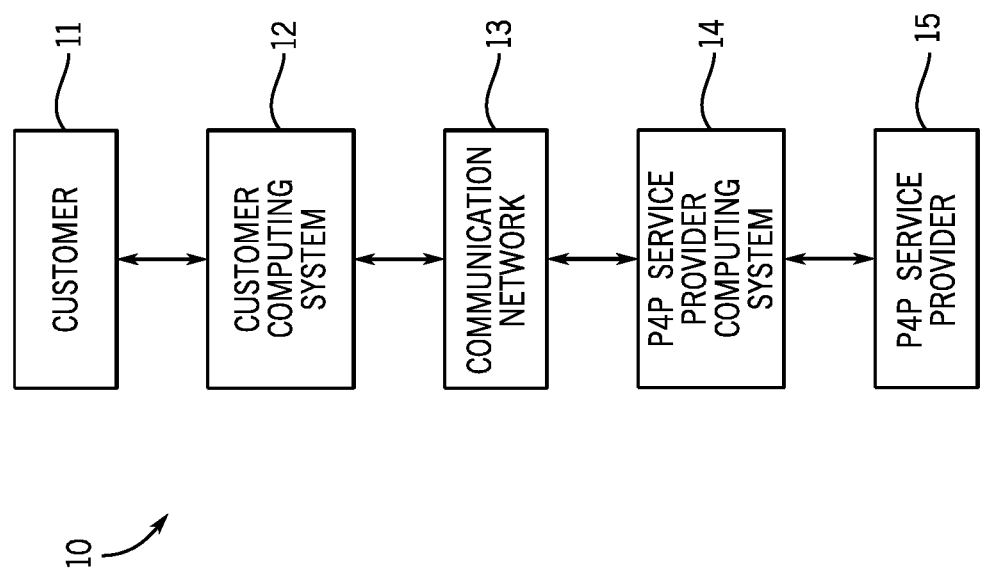
FIG. 9 illustrates an exemplary, communication system through which a customer and a P4P service provider can communicate.

FIG. 9 shows an exemplary communication system 10 through which the customer 11 and a P4P service provider 15 can communicate and conduct business. A customer 11 has a computing system 12 capable of communicating through a communication network 13, for example, the Internet. A P4P service provider 15 has a computing system 14 and can communicate through the communication network 13. Thus, the customer 11 and the P4P service provider 15 can communicate with each other through, for example, the Internet.

Figure 10:
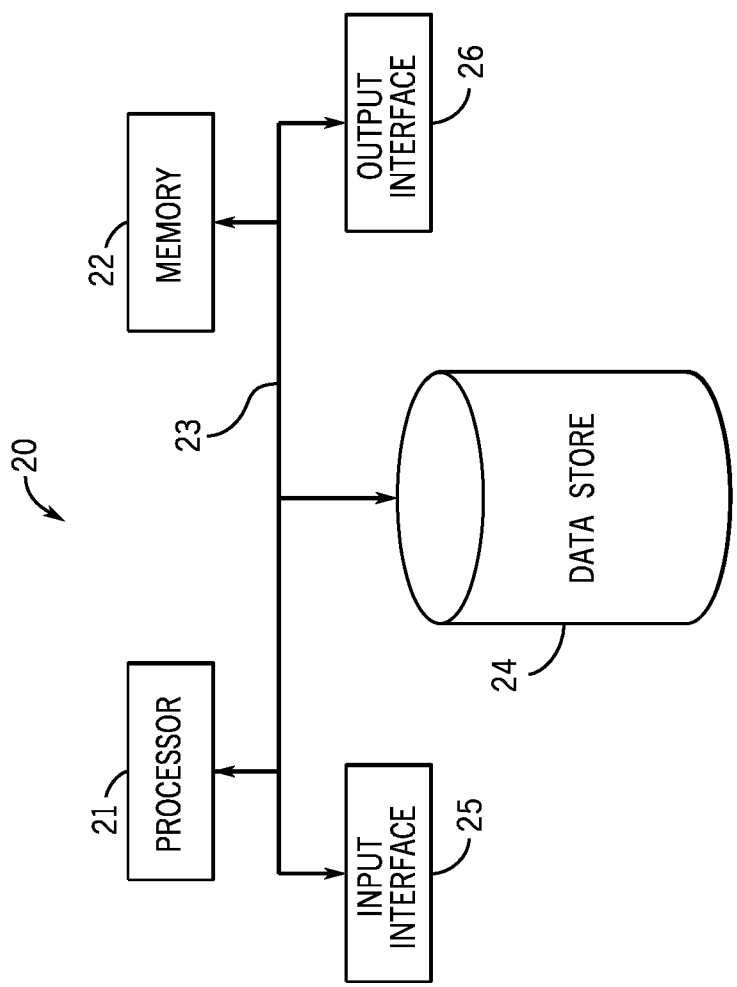
FIG. 10 illustrates an exemplary computing system that can be used in accordance with the systems and methodologies disclosed.

FIG. 10 illustrates an exemplary computing system 20 that can be used in accordance with the systems and methodologies disclosed. For example, the computing device 20 can be used to perform all the calculations required to implement the algorithms disclosed herein and to perform the steps of the method and system of the present invention. The computing device 20 includes at least one processor 21 that executes instructions that are stored in a memory 22. The instructions may be, for instance, instructions for implementing functionality described as being carried out by one or more components discussed above or instructions for implementing one or more of the methods described above. The processor 21 may access the memory 22 by way of a system bus 23. In addition to storing executable instructions, the memory 22 may also store operating parameters, required algorithm software, and so forth.

The computing device 20 additionally includes a data store 24 that is accessible by the processor 21 by way of the system bus 23. The data store 24 may include executable instructions, operating parameters, required operating parameters, etc. The computing device 20 also includes an input interface 25 that allows external devices, such as the Internet system, to communicate with the computing device 20. The input interface 25 may also be used to receive instructions from an external computer device, from a user, etc. The computing device 10 also includes an output interface 26 that interfaces the computing device 10 with one or more external devices, such as the Internet system. The computing device 10 may also display text, images, etc., by way of the output interface 26.

Additionally, while illustrated as a single system, it is to be understood that the computing device 20 may be a distributed system. Thus, for example, several devices may be in communication by way of a network connection and may collectively perform tasks described as being performed by the computing device 20.

The foregoing description illustrates and describes the disclosure. Additionally, the disclosure shows and describes only the preferred embodiments but, it is to be understood that the preferred embodiments are capable of being formed in various other combinations, modifications, and environments and are capable of changes or modifications within the scope of the invention concepts as expressed herein, commensurate with the above teachings and/or the skill or knowledge of the relevant art. The embodiments described herein above are further intended to explain the best modes known by applicant and to enable others skilled in the art to utilize the disclosure in such, or other, embodiments and with the various modifications required by the particular applications or uses thereof. Accordingly, the description is not intended to limit the invention to the form disclosed herein. Also, it is intended that the appended claims be construed to include alternative embodiments. It will be further understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A computer-implemented method for providing, by a service provider, a range of optimized predicted wall-clock times for executing a desired software operation, comprising:
    a) providing by a user, to a service provider, the desired software operation for implementation in a computer system;
    b) analyzing the desired software operation by the service provider using a resource estimation model, wherein the resource estimation model comprises:
        i) identifying computer resource sets required to perform the desired software operation;
        ii) determining wall-clock computing time for each computer resource set; and
        iii) optimizing predicted wall-clock computing time using a nonlinear function operation that maps resources to total wall-clock computing time requirements, thereby providing an optimized resource estimation model;
    c) iteratively cycling through permutations of a plurality of resource sets using the optimized resource estimation model, thereby providing a list of optimized predicted wall-clock times corresponding to each resource set;
    d) presenting, by the service provider, through the service provider's computer system, to the user through the user's computer system a list of costs comprising a range of costs corresponding to a range of optimized predicted wall-clock times for execution of the desired software operation;
    e) selecting by the user, from the list of costs, a particular cost and corresponding optimized predicted wall-clock time and requesting by the user an execution of the desired software operation by the service provider using the resource set corresponding to the selected optimized predicted wall-clock time; and
    f) executing by the service provider the desired software operation using the resource set associated with the selected optimized predicted wall-clock time and providing the user results of executing the desired software operation;
    wherein using the resource estimation model further comprises:
        a) identification of the desired software operation's wall-clock time-influencing components;
        b) identification of potential resources;
        c) collecting wall-clock times for each time-influencing component of the desired software operation on the potential resources;
        d) optimization of the resource estimation model to determine optimized predicted wall-clock times using an optimization algorithm to determine the proper mathematical form of the resource estimation model and optimal values of control parameters operating on resource estimation model inputs, wherein the optimization process iteratively adjusts the control parameters to achieve a low level of error between inputs-to-wall-clock time values to that predicted by the resource optimization model as it is being optimized; and
        e) executing the resource estimation model to predict wall-clock times to complete execution of the desired software operation wherein the resource estimation model iteratively cycles through possible permutations of resources to identify a list of wall-clock times corresponding to available resources; and
    wherein collecting predicted wall-clock times for each time influencing component of the desired software operation on the potential resources further comprises:
        a) instantiating a particular inputs of the desired software operation;
        b) instantiating a particular resource set from a list of resource options;
        c) executing the desired software operation;
        d) extracting predicted performance wall-clock times;
        e) storing input parameters and wall-clock times; and
        f) repeating steps a-e optimizing the resource estimation model's accuracy in predicting wall-clock time.

2. The computer-implemented method of claim 1, further comprising collecting optimized predicted wall-clock times from the resource estimation model during execution of the desired software operation.

3. A computer-implemented method for providing, by a service provider, a range of optimized predicted wall-clock times for executing a desired software operation, comprising:
    a) providing by a user, to a service provider, the desired software operation for implementation in a computer system;
    b) analyzing the desired software operation by the service provider using a resource estimation model, wherein the resource estimation model comprises:
        i) identifying computer resource sets required to perform the desired software operation;
        ii) determining wall-clock computing time for each computer resource set; and
        iii) optimizing predicted wall-clock computing time using a nonlinear function operation that maps resources to total wall-clock computing time requirements, thereby providing an optimized resource estimation model;

c) iteratively cycling through permutations of a plurality of resource sets using the optimized resource estimation model, thereby providing a list of optimized predicted wall-clock times corresponding to each resource set;

d) presenting, by the service provider, through the service provider's computer system, to the user through the user's computer system a list of costs comprising a range of costs corresponding to a range of optimized predicted wall-clock times for execution of the desired software operation;

e) selecting by the user, from the list of costs, a particular cost and corresponding optimized predicted wall-clock time and requesting by the user an execution of the desired software operation by the service provider using the resource set corresponding to the selected optimized predicted wall-clock time; and f) executing by the service provider the desired software operation using the resource set associated with the selected optimized predicted wall-clock time and providing the user results of executing the desired software operation;

wherein using the resource estimation model further comprises:
  a) identification of the desired software operation's wall-clock time-influencing components;
  b) identification of potential resources;
  c) collecting wall-clock times for each time-influencing component of the desired software operation on the potential resources;
  d) optimization of the resource estimation model to determine optimized predicted wall-clock times using an optimization algorithm to determine the proper mathematical form of the resource estimation model and optimal values of control parameters operating on resource estimation model inputs, wherein the optimization process iteratively adjusts the control parameters to achieve a low level of error between inputs-to-wall-clock time values to that predicted by the resource optimization model as it is being optimized; and
  e) executing the resource estimation model to predict wall-clock times to complete execution of the desired software operation wherein the resource estimation model iteratively cycles through possible permutations of resources to identify a list of wall-clock times corresponding to available resources; and wherein optimization of the resource estimation model to determine optimized predicted wall-clock times further comprises:
  a) selecting an initial resource estimation model;
  b) initializing control parameters of the initial resource estimation model;
  c) executing the resource estimation model on inputs; and
  d) evaluating resource estimation model error to determine if resource estimation model error is less than threshold, wherein optimization is complete.

4. A computer-implemented method for providing, by a service provider, a range of optimized predicted wall-clock times for executing a desired software operation, comprising:

a) providing by a user, to a service provider, the desired software operation for implementation in a computer system;

b) analyzing the desired software operation by the service provider using a resource estimation model, wherein the resource estimation model comprises:
  i) identifying computer resource sets required to perform the desired software operation;
  ii) determining wall-clock computing time for each computer resource set; and
  iii) optimizing predicted wall-clock computing time using a nonlinear function operation that maps resources to total wall-clock computing time requirements, thereby providing an optimized resource estimation model;

c) iteratively cycling through permutations of a plurality of resource sets using the optimized resource estimation model, thereby providing a list of optimized predicted wall-clock times corresponding to each resource set;

d) presenting, by the service provider, through the service provider's computer system, to the user through the user's computer system a list of costs comprising a range of costs corresponding to a range of optimized predicted wall-clock times for execution of the desired software operation;

e) selecting by the user, from the list of costs, a particular cost and corresponding optimized predicted wall-clock time and requesting by the user an execution of the desired software operation by the service provider using the resource set corresponding to the selected optimized predicted wall-clock time; and f) executing by the service provider the desired software operation using the resource set associated with the selected optimized predicted wall-clock time and providing the user results of executing the desired software operation;

wherein using the resource estimation model further comprises:
  a) identification of the desired software operation's wall-clock time-influencing components;
  b) identification of potential resources;
  c) collecting wall-clock times for each time-influencing component of the desired software operation on the potential resources;
  d) optimization of the resource estimation model to determine optimized predicted wall-clock times using an optimization algorithm to determine the proper mathematical form of the resource estimation model and optimal values of control parameters operating on resource estimation model inputs, wherein the optimization process iteratively adjusts the control parameters to achieve a low level of error between inputs-to-wall-clock time values to that predicted by the resource optimization model as it is being optimized; and
  e) executing the resource estimation model to predict wall-clock times to complete execution of the desired software operation wherein the resource estimation model iteratively cycles through possible permutations of resources to identify a list of wall-clock times corresponding to available resources; and wherein executing the resource estimation model to predict wall-clock times required to complete execution of the desired software operation further comprises:
  a) obtaining a list of available resources;
  b) selecting an initial resource set and obtaining user input data;
  c) executing the optimized resource model;
  d) appending and sorting an optimized predicted wall-clock time list; and
  e) beginning cost determination of optimized predicted wall-clock times.

5. The computer-implemented method of claim 4 wherein a minimum cost is determined from a resource set with the lowest optimized predicted wall-clock time.

6. A computer-implemented method for providing, by a service provider, a range of optimized predicted wall-clock times for executing a desired software operation, comprising:
  a) providing by a user, to a service provider, the desired software operation for a method for implementation in a computer system;
  b) analyzing the desired software operation by the service provider using a resource estimation model, wherein the resource estimation model comprises:
    i) identifying computer resource sets required to perform the desired software operation;
    ii) determining wall-clock computing time for each computer resource set; and
    iii) optimizing predicted wall-clock computing time using a nonlinear function operation that maps resources to total wall-clock computing time requirements, thereby providing an optimized resource estimation method;
  c) iteratively cycling through permutations of a plurality of resource sets using the optimized resource estimation model, thereby providing a list of optimized predicted wall-clock times corresponding to each resource set;
  d) presenting, by the service provider, through the service provider's computer system, to the user through the user's computer system a list comprising a range of costs corresponding to a range of optimized predicted wall-clock times for execution of the desired software operation;
  e) selecting by the user, based upon costs from the list of costs a optimized predicted wall-clock time and requesting by the user an execution of the desired software operation by the service provider using the resource set corresponding to the selected optimized predicted wall-clock time; and
  f) executing by the service provider the desired software operation using the resource set associated with the selected optimized predicted wall-clock time and providing the user results of executing the desired software operation; and
  g) collecting predicted optimized wall-clock times from the resource estimation model during execution of the desired software operation,
  wherein using the resource estimation model further comprises identification of the desired software operation's wall-clock time-influencing components; identification of potential resources; collecting wall-clock times for each time-influencing component of the desired software operation on the potential resources; optimization of the resource estimation model to determine optimized predicted wall-clock times using an optimization algorithm to determine the proper mathematical form of the resource estimation model and optimal values of control parameters operating on the resource estimation model inputs, wherein the optimization process iteratively tunes the control parameters to achieve a low level of error between inputs-to-wall-clock time values to that predicted by the resource optimization model as it is being optimized, and executing the resource estimation model to predict wall-clock times to complete execution of the desired software operation,
  wherein the resource estimation model iteratively cycles through possible permutations of resources to identify a list of wall-clock times corresponding to available resources, and
  wherein collecting predicted wall-clock times for each time influencing component of the desired software operation on the potential resources further comprises instantiating particular inputs of the desired software operation; instantiating particular resource set from a list of resource options; executing the desired software operation; extracting predicted performance wall-clock times; storing input parameters and wall-clock times; and repeating steps from instantiating a particular resource set from a list of resource options to storing input parameters and wall-clock times optimizing the resource estimation model's accuracy in predicting wall-clock time.

7. The computer-implemented method of claim 6 wherein optimization of the resource estimation model to determine optimized predicted wall-clock times further comprises:
  a) selecting an initial resource estimation model;
  b) initializing control parameters of the initial resource estimation model;
  c) executing the resource estimation model on inputs; and
  d) evaluating resource estimation model error to determine if resource estimation model error is less than threshold, wherein optimization is complete.

8. The computer-implemented method of claim 6 wherein executing the resource estimation model to predict performance wall-clock times required to complete execution of the desired software operation further comprises:
  a) obtaining a list of available resources;
  b) selecting an initial resource set and obtaining user input data;
  c) executing the optimized resource model;
  d) appending and sorting an optimized predicted wall-clock time list; and
  e) beginning cost determination of optimized predicted wall-clock times.

9. The computer-implemented method of claim 6 wherein a minimum cost is determined from a resource set with the lowest optimized predicted wall-clock time.

10. A computer-implemented method for providing, by a service provider, a range of optimized predicted wall-clock times for executing a desired software operation, comprising:
  a) providing by a user, to a service provider, the desired software operation for a method for implementation in a computer system;
  b) analyzing the desired software operation by the service provider using a resource estimation model, wherein the resource estimation model comprises:
    i) identifying computer resource sets required to perform the desired software operation;
    ii) determining wall-clock computing time for each computer resource set; and
    iii) optimizing predicted wall-clock computing time using a nonlinear function operation that maps resources to total wall-clock computing time requirements, thereby providing an optimized resource estimation model;

c) iteratively cycling through permutations of a plurality of resource sets using the optimized resource estimation model, thereby providing a list of optimized predicted wall-clock times corresponding to each resource set;

d) presenting, by the service provider, through the service provider's computer system, to the user through the user's computer system a list comprising a range of costs corresponding to a range of optimized predicted wall-clock times for execution of the desired software operation;

e) selecting by the user, based upon costs from the list of costs a optimized predicted wall-clock time and requesting by the user an execution of the desired software operation by the service provider using the resource set corresponding to the selected optimized predicted wall-clock time; and f) executing by the service provider the desired software operation using the resource set associated with the selected optimized predicted wall-clock time and providing the user results of executing the desired software operation; and g) collecting optimized predicted wall-clock times from the resource estimation model during execution of the desired software operation, wherein using the resource estimation model further comprises identification of the desired software operation's wall-clock time-influencing components; identification of potential resources; collecting wall-clock times for each time-influencing component of the desired software operation on the potential resources; optimization of the resource estimation model to determine optimized predicted wall-clock times using an optimization algorithm to determine the proper mathematical form of the resource estimation model and optimal values of control parameters operating on the resource estimation model inputs, wherein the optimization process iteratively tunes the control parameters to achieve a low level of error between inputs-to-wall-clock time values to that predicted by the resource optimization model as it is being optimized, and executing the resource estimation model to predict optimized wall-clock times to complete execution of the desired software operation, wherein the resource estimation model iteratively cycles through possible permutations of resources to identify a list of wall-clock times corresponding to available resources, wherein collecting predicted wall-clock times for each time-influencing component of the desired software operation on the potential resources further comprises instantiating a particular inputs of the desired software operation; instantiating a particular resource set from a list of resource options; executing the desired software operation; extracting predicted performance wall-clock times; storing input parameters and wall-clock times; and repeating steps from instantiating a particular resource set from a list of resource options to storing input parameters and wall-clock times optimizing the resource estimation model's accuracy in predicting optimized wall-clock time, wherein optimization of the resource estimation model for predicted performance wall-clock time further comprises selecting an initial resource estimation model, initializing control parameters of the initial resource estimation model; executing the resource estimation model on the input set; and evaluating resource estimation model error to determine if resource estimation model error is less than threshold wherein optimization is complete, wherein executing the resource estimation model to predict performance wall-clock times required to complete execution of the desired software operation further comprises obtaining a list of available resources; selecting an initial resource set and obtaining user input data; executing the optimized resource model; appending and sorting an optimized predicted wall-clock time list; and beginning cost determination of predicted performance wall-clock times.

11. The computer-implemented method of claim 10 wherein a minimum cost is determined from a resource set with the lowest optimized predicted wall-clock time.

* * * * *